June 30, 1942. E. E. LONGFELLOW 2,288,584
SURGEON'S SCREW DRIVER, SCREW HOLDER, AND STABILIZER
Filed May 23, 1940
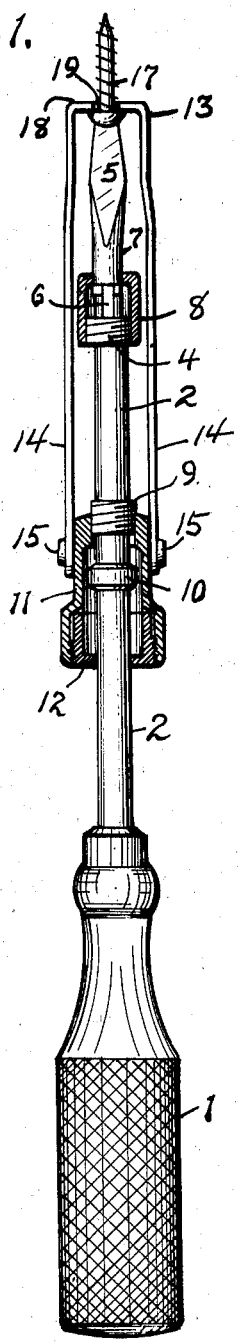
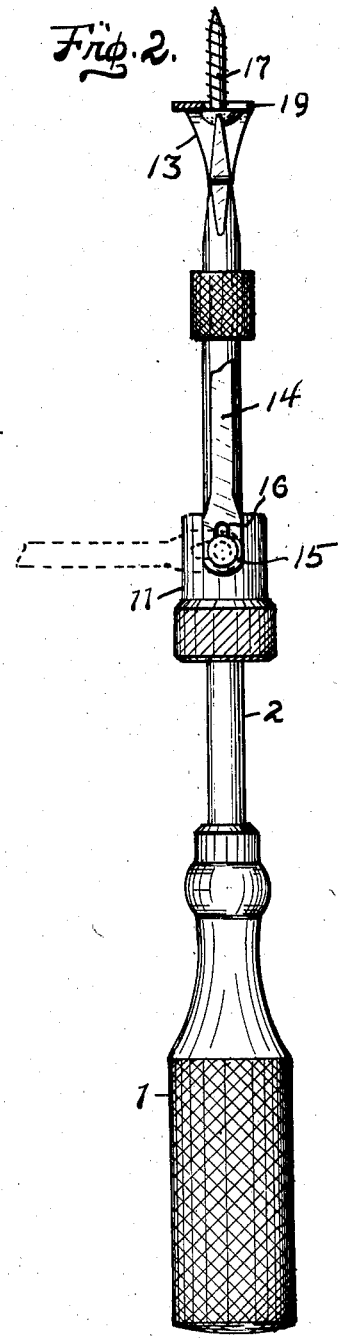
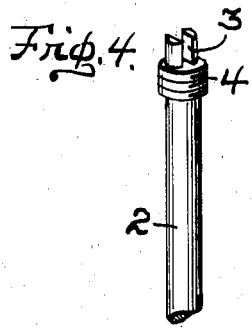
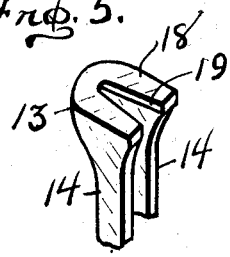

Patented June 30, 1942

2,288,584

UNITED STATES PATENT OFFICE 2,288,584

SURGEON'S SCREW DRIVER, SCREW HOLDER, AND STABILIZER

Earl E. Longfellow, Warsaw, Ind., assignor to Harry Herschel Leiter, Warsaw, Ind.

Application May 23, 1940, Serial No. 336,795

2 Claims. (Cl. 145—52)

This invention relates to improvements in a surgeon's screw-driver, screw-holder and stabilizer, and the object thereof is to provide in connection with a screw-driver an appliance for temporarily holding a screw in operative connection with the nib of a screw-driver preliminary to driving the screw in place, and which subsequently is moved from engagement with the screw and then utilized as a stabilizer for the screw-driver while driving the screw to its final emplacement.

Another object of the invention is to so construct the screw-holder and stabilizer and its connection with the shank of the screw-driver so that free rotation of the screw-driver upon its axis is permitted while the appliance is utilized as a stabilizer during which relative longitudinal movement of the stabilizer with respect to the shank of the screw-driver is circumvented.

Other objects and advantages of the invention appear in the following description.

An illustrative embodiment of the invention is shown in the accompanying drawing, in which:

Fig. 1 is a front elevational view of an instrument in which the invention is embodied, portions thereof being in section;

Fig. 2 is a similar view in a plane at right angles to that of Fig. 1, a portion thereof being broken away;

Fig. 3 is a perspective view showing a nib for the screw-driver;

Fig. 4 is a fragmentary perspective view showing the upper end of the screw-driver shank; and Fig. 5 is a fragmentary perspective view of the head for the screw-holder.

An illustrative embodiment of the invention consists of a screw-driver having a handle 1, and a straight round shank 2 the upper end of which is provided with a transverse recess 3 that opens through the end of the shank, there being formed on the shank at a point adjacent its end a threaded shoulder 4. A nib 5 is formed at its base with a transversely disposed flat lug 6 the lateral ends of which project beyond the neck 7 of the nib, the lug being shaped so as to fit in the recess 3 in the shank when the nib is positioned thereon. A sleeve coupler 8 is provided that fits loosely around the neck 7 of the nib and has threaded connection with the shoulder 4 and engages the projecting ends of the lug 6, thus when the sleeve is tightened the nib is secured in axial alinement with the shank of the screw-driver.

Upon the shank 2 is provided a second threaded shoulder 9 and also an annular stop lug 10 that are spaced apart and preferably located on the shank approximately midway between the handle and the outer end of the shank. A tubular anchor 11 is arranged upon the shank with its upper end threaded on said second threaded shoulder 9, encompasses the stop lug 10 and is provided in its lower end with a collar 12 that is loose on the shank and is threaded in the anchor. The bore of the upper threaded end of the anchor is smaller in diameter than the stop lug so that relative axial movement of the anchor 11 with respect to the shank is limited in one direction by contact of the stop lug with the upper end portion of the anchor, and in the opposite direction by contact of the stop lug with the collar. Upon turning of the shank in the anchor so that the second threaded shoulder 9 reaches beyond the top of the anchor, the stop lug then becomes engaged with the wall of the anchor thereby preventing further axial back movement of the anchor on the shank while permitting free turning movement of the shank in the anchor. Or, when the shank is turned backwardly the threaded shoulder 9 is drawn into the anchor out of its threaded connection therewith, whereupon the shank may be rotated freely in the anchor.

A shackle 13, preferably U-shaped and having side arms 14, is secured to the anchor 11 by means of trunnions 15 that extend through elongated openings 16 in the lower ends of the shackle arms thus to permit limited longitudinal movement of the shackle relative to the anchor when the shackle is moved to position for engagement with a screw 17. The head 18 of the shackle has made therein a slot 19 that opens at the front of the head and tapers gradually toward the back thereof so as to receive the stems of various sizes of screws. The shackle serves to secure the screw 17 on the nib of the screw-driver temporarily wherefore to facilitate placing of the screw in position to be driven into parts (not shown) that are to be secured by the screw. Also, after the screw has been driven partially into place, the shackle is disconnected from the screw by turning the anchor forwardly on the threaded shoulder 9 and swinging the shackle clear from the screw. This is readily done without unseating the nib from the head of the screw 17. The shackle then is turned upon its trunnions to a position at right angles to the axis of the screw-driver. While in this position the shackle is held in one hand by the operator and serves as a stabilizer wherefore to hold the screw-driver in position steadily in connection with the screw 17 during completion of the driving operation which is effected by turning of the handle 1 by the operator with his other hand. Free turning movement of the shank in the anchor while driving or in withdrawing the screw 17 is permitted as the anchor is held from rotation by the shackle when held in stabilizing position since the threaded shoulder 9 is screwed out of the anchor when turned in one direction and is drawn into the anchor free from its threaded connection therewith as the screw-driver is rotated in the opposite direction. In either event the stop lug restricts axial movement of the anchor on the shank and thus the anchor is retained in proper supporting position while the screw-driver is being operated.

In manipulating the instrument, the screw 17 is readily secured on the nib by first turning the anchor forwardly, then placing the slotted head of the screw 17 on the end of the nib and swinging the shackle so that its slotted head extends back of the head of the screw and astride the stem thereof, after which by sliding the shackle backwardly on its trunnions, which is permitted because of the elongated slots 16 in the shackle arms, the head of the shackle is thus brought downwardly against the back of the screw head where it is momentarily held in place on the nib. By turning the screw-driver forwardly in the anchor, while the screw is thus positioned in the head, it is forced firmly against the shackle head when the slack between the shackle arms and the trunnions is completely taken up. The screw is then inserted into its emplacement in the parts to be secured while held firmly in the instrument. The operation is facilitated because of the positive connection of the instrument with the screw, especially when a deep incision has been made in the flesh overlying a bone structure to permit direct approach of the screw to the place in the structure where required. The shackle is then disconnected after the screw is firmly positioned partway into the bone structure by turning the anchor forwardly on the threaded shoulder 9, thus loosening the head of the shackle from the screw head, and thereafter the shackle is swung to its stabilizing position and utilized in holding the screw-driver in place against the screw head while completing the screw driving operation.

Variations from the particular construction above disclosed may readily be made by exercise of engineering skill without departure from the spirit or scope of the invention, and the following claims are intended to be inclusive of such variations.

What I claim is:

1. A screw driving appliance consisting of a screw-driver, the shank of which has thereon a threaded shoulder and an annular stop lug, said shoulder and lug being spaced apart from each other and the lug being of greater diameter than the shoulder, a tubular anchor provided with inturned ends and slidably and rotatably arranged upon said shank with one end threaded on said shoulder and its opposite end having a collar through which said shank loosely extends, said stop lug being disposed within the anchor and adapted to limit axial movement thereof on said shank, and a shackle having means for connection with said anchor for swinging and limited longitudinal sliding movements thereon and having a head provided with a screw-receiving slot therein, said shackle being adapted to hold the head of a screw on the nib of said screw-driver when said shackle is in one position and in another position to serve in conjunction with the anchor as a stabilizer for the screw-driver.

2. In a screw driving appliance, a screw-driver, a threaded shoulder on the shank of said screw-driver, a stop lug on said shank at a point thereon spaced from and of greater diameter than said shoulder, a tubular anchor encompassing said stop lug, said anchor being internally threaded at the one end for engagement with said shoulder and having its other end inturned to rotatably and slidably engage the shank, whereby said anchor has axial movement on said shank limited by said stop lug and free turning movement on the shank when disengaged from said shoulder, and a shackle secured to said anchor for swinging movement thereon and having a screw-receiving slot in the outer end thereof adapted to engage and hold a screw on the nib of said screw-driver when said shackle is in one position and to serve in connection with the anchor as a stabilizer for the screw driver when in another position.

EARL E. LONGFELLOW.